United States Patent
Kim et al.

(10) Patent No.: US 12,099,913 B2
(45) Date of Patent: Sep. 24, 2024

(54) METHOD FOR NEURAL-NETWORK-LIGHTENING USING REPETITION-REDUCTION BLOCK AND APPARATUS FOR THE SAME

(71) Applicant: ELECTRONICS AND TELECOMMUNICATIONS RESEARCH INSTITUTE, Daejeon (KR)

(72) Inventors: Hye-Jin Kim, Daejeon (KR); Sang-Yun Oh, Yeongju (KR); Jong-Eun Lee, Ulsan (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 1155 days.

(21) Appl. No.: 16/698,711

(22) Filed: Nov. 27, 2019

(65) Prior Publication Data

US 2020/0175353 A1    Jun. 4, 2020

(30) Foreign Application Priority Data

Nov. 30, 2018  (KR) .................. 10-2018-0152723
Jun. 14, 2019  (KR) .................. 10-2019-0070950

(51) Int. Cl.
*G06N 3/04*   (2023.01)
*G06N 3/082*  (2023.01)

(52) U.S. Cl.
CPC ............. *G06N 3/04* (2013.01); *G06N 3/082* (2013.01)

(58) Field of Classification Search
CPC .................. G06N 3/04; G06N 3/082
See application file for complete search history.

(56) References Cited

U.S. PATENT DOCUMENTS

| | | |
|---|---|---|
| 2017/0161604 A1 | 6/2017 | Craddock et al. |
| 2018/0165578 A1 | 6/2018 | Chung et al. |
| 2018/0204110 A1 | 7/2018 | Kim et al. |

FOREIGN PATENT DOCUMENTS

| | | |
|---|---|---|
| EP | 2122542 B1 | 11/2017 |
| KR | 20180077260 A | 7/2018 |

OTHER PUBLICATIONS

Lee, D., Kwon, Y. P., McMains, S., & Hedrick, J. K. (Oct. 2017). Convolution neural network-based lane change intention prediction of surrounding vehicles for ACC. In 2017 IEEE 20th International Conference on Intelligent Transportation Systems (ITSC) (pp. 1-6). IEEE. (Year: 2017).*

(Continued)

*Primary Examiner* — Ryan C Vaughn
*Assistant Examiner* — Lokesha G Patel

(57) ABSTRACT

Disclosed herein are a neural-network-lightening method using a repetition-reduction block and an apparatus for the same. The neural-network-lightening method includes stacking (accumulating) an output layer (value) of either one or both of a layer constituting a neural network and a repetition-reduction block in a Condensed Decoding Connection (CDC), and lightening the neural network by reducing a feature map, generated to correspond to data stacked in the CDC, based on a preset reduction layer.

11 Claims, 13 Drawing Sheets

(56) References Cited

OTHER PUBLICATIONS

Feichtenhofer, C., Pinz, A., & Zisserman, A. (2016). Convolutional two-stream network fusion for video action recognition. In Proceedings of the IEEE conference on computer vision and pattern recognition (pp. 1933-1941). (Year: 2016).*

Shin, H. C., Orton, M. R., Collins, D. J., Doran, S. J., & Leach, M. O. (2012). Stacked autoencoders for unsupervised feature learning and multiple organ detection in a pilot study using 4D patient data. IEEE transactions on pattern analysis and machine intelligence, 35(8), 1930-1943. (Year: 2012).*

Abdel-Hamid, O., Mohamed, A. R., Jiang, H., & Penn, G. (Mar. 2012). Applying convolutional neural networks concepts to hybrid NN-HMM model for speech recognition. In 2012 IEEE international conference on Acoustics, speech and signal processing (ICASSP) (pp. 4277-4280). IEEE. (Year: 2012).*

Dong, C., Loy, C. C., & Tang, X. (2016). Accelerating the super-resolution convolutional neural network. In Computer Vision—ECCV 2016: 14th European Conference, Amsterdam, The Netherlands, Oct. 11-14, 2016, Proceedings, Part II 14 (pp. 391-407). Springer International Publishing. (Year: 2016).*

Shen, C. A., & Eltawil, A. M. (2010). A radius adaptive K-best decoder with early termination: Algorithm and VLSI architecture. IEEE Transactions on Circuits and Systems I: regular papers, 57(9), 2476-2486. (Year: 2010).*

Mark Sandler et al., "MobileNetV2: Inverted Residuals and Linear Bottlenecks", 2018 IEEE/CVF Conference on Computer Vision and Pattern Recognition.

* cited by examiner

| LAYER | TYPE | OFMS | IFMS | K |
|---|---|---|---|---|
| CONV1 | FORWARD | 32 | 3 | 7 |
| POOL1 | MAX-POOL | 32 | | |
| CONV2 | FORWARD | 64 | 32 | 5 |
| POOL2 | MAX-POOL | 64 | | |
| CONV3-1 | FORWARD | 128 | 64 | 3 |
| CONV3-2 | FORWARD | 128 | 128 | 3 |
| POOL3 | MAX-POOL | 128 | | |
| CONV4-1 | FORWARD | 256 | 128 | 3 |
| CONV4-2 | FORWARD | 256 | 256 | 3 |
| POOL4 | MAX-POOL | 256 | | |
| CONV5-1 | FORWARD | 512 | 256 | 3 |
| CONV5-2 | FORWARD | 512 | 512 | 3 |
| POOL5 | MAX-POOL | 512 | | |
| CONV6-1 | FORWARD | 512 | 512 | 3 |
| CONV6-2 | FORWARD | 512 | 512 | 3 |
| POOL6 | MAX-POOL | 512 | | |
| CONV7-1 | FORWARD | 512 | 512 | 3 |
| CONV7-2 | FORWARD | 512 | 512 | 3 |

1110 — CONV3-1, CONV3-2
1120 — CONV4-1, CONV4-2
1130 — CONV5-1, CONV5-2
1140 — POOL6, CONV7-1, CONV7-2

FIG. 11

| LAYER | TYPE | OFMS | IFMS | K | RPT |
|---|---|---|---|---|---|
| CONV1 | FORWARD | 16 | 3 | 3 | |
| POOL1 | MAX-POOL | 16 | | | |
| CONV2 | FORWARD | 32 | 16 | 3 | |
| POOL2 | MAX-POOL | 32 | | | |
| RRBLK3 | REDUCTION | 16 | 32 | 1 | |
| | EXPANSION | 128 | 16 | 3 | 1 |
| RRBLK3 | MAX-POOL | 128 | | | |
| RRBLK4 | REDUCTION | 32 | 128 | 1 | |
| | EXPANSION | 256 | 32 | 3 | 1 |
| POOL4 | MAX-POOL | 256 | | | |
| RRBLK5 | REDUCTION | 64 | 256 | 1 | |
| | EXPANSION | 512 | 64 | 3 | 1 |
| POOL5 | MAX-POOL | 512 | | | |
| DROP5 | DROP-OUT | RATIO: 0.7 | | | |
| CONV6 | FORWARD | 512 | 512 | 1 | |

1210 — RRBLK3, RRBLK4, RRBLK5

FIG. 12

METHOD FOR NEURAL-NETWORK-LIGHTENING USING REPETITION-REDUCTION BLOCK AND APPARATUS FOR THE SAME

CROSS REFERENCE TO RELATED APPLICATIONS

This application claims the benefit of Korean Patent Application Nos. 10-2018-0152723, filed Nov. 30, 2018 and 10-2019-0070950, filed Jun. 14, 2019, which are hereby incorporated by reference in their entireties into this application.

BACKGROUND OF THE INVENTION

1. Technical Field

The present invention relates generally to technology for designing a neural network, and more particularly to technology for designing a lightweight neural network architecture, which processes fast operations while maintaining existing network performance and decreasing power consumption.

2. Description of the Related Art

The design of a neural network has been performed using a scheme for repeating a large number of attempts and for selecting a network architecture having better performance from among various network architectures based on the results of the attempts. Since this scheme performs Design Space Exploration (DSE) in a very wide area, there is a disadvantage in that a lot of time is needed to derive effective conclusions.

Also, in the conventional technology, a network has been designed in a form in which each designed network architecture is modified to fit the purpose of a corresponding application with reference to a network architecture called a backbone network. As examples of a widely known backbone network, there are LeNet, AlexNet, GoogLeNet, VGG-Net, ResNet, etc. Networks modified to fit respective purposes in application fields in this way may be further modified into detailed network architectures under a large network frame.

Generally, a neural network may be composed of a single layer, such as a correlation layer or a dilation layer, and principal layers, each of which performs tasks, other than continuous convolution, as a single layer, such as a pooling layer, a sigmoid layer, or a fully-connected (FC) layer, in addition to concatenation of 1×1 convolution layers and skip connection location where the concatenation is to be skipped.

To date, a neural network has been designed while all of various layers are individually considered. However, as a design exploration area has greatly widened, the number of issues to be taken into consideration has greatly increased. That is, a problem may arise in that, in addition to the large frame size, the number of issues of portions to be taken into consideration has increased.

In other words, when there are many areas to be explored, a lot of time is required for exploration, and the complexity of an exploration area is inevitably increased in the case of a more complicated network. Also, in a neural network, the deeper the network, the longer the unit of learning time; that is, days rather than hours are required, and thus a considerable time is inevitably required for many experiments.

Due thereto, design exploration for a neural network architecture is generally configured to complete architecture exploration by making a compromise at a reasonable level to some degree.

PRIOR ART DOCUMENTS

Patent Documents (Patent Document 1) Korean Patent Application Publication No. 10-2018-0077260, Date of Publication: Jul. 6, 2018 (Title: Determining Orders of Execution of a Neural Network)

SUMMARY OF THE INVENTION

Accordingly, the present invention has been made keeping in mind the above problems occurring in the prior art, and an object of the present invention is to design a network that enables fast calculation despite imposing only a low computational load and has a low power consumption architecture by reducing the design exploration range of a neural network.

Another object of the present invention is to remodel a conventionally published network so that the network has low power consumption, light weight, and high-speed architecture.

A further object of the present invention is to design a neural network having a suitable depth level based on a repetition block, thus preventing a computational load from excessively increasing.

Yet another object of the present invention is to relatively easily design a network architecture by reducing the number of layer-unit combinations while designing a network through the design of a block-unit model using a repetition block.

Still another object of the present invention is to stack (accumulate) repetition blocks or previously output layers in a condensed decoding connection (CDC), and reduce the stacked layers based on a reduction layer, thus designing a lightweight network architecture having a relatively low computational load.

In accordance with an aspect of the present invention to accomplish the above objects, there is provided a neural-network-lightening method, including stacking an output layer (value) of either one or both of a layer constituting a neural network and a repetition-reduction block in a Condensed Decoding Connection (CDC); and lightening the neural network by reducing a feature map, generated to correspond to data stacked in the CDC, based on a preset reduction layer.

The repetition-reduction block may correspond to a section in which layer reduction and layer expansion are repeatedly performed so that each of multiple block sections classified into block units depending on preset classification conditions, in an entire architecture of the neural network, is capable of exhibiting optimal performance.

The neural-network-lightening method may further include generating a repetition-reduction block candidate group based on setting of hyperparameters for respective multiple block sections; and selecting any one repetition-reduction block candidate having optimal performance as the repetition-reduction block from the repetition-reduction block candidate group based on a performance evaluation.

The repetition-reduction block candidate group may include multiple repetition-reduction block candidates having different values of the hyperparameters.

The neural-network-lightening method may further include, when the neural network is a previously developed neural network that is not configured using block units, classifying the previously developed neural network into block units based on the preset classification conditions.

The preset classification conditions may include any one or any combination of any two or more of a first classification condition which classifies multiple consecutive convolution layers based on sub-sampling layers, a second classification condition which classifies multiple consecutive convolution layers based on layers having a skip connection, a third classification condition which classifies multiple consecutive convolution layers, which do not include sub-sampling layers, based on a preset consecutive number of times, a fourth classification condition which classifies depth concatenations between layers as a single block section, and a fifth classification condition which classifies convolution layers based on layers having different properties from the multiple consecutive convolution layers.

The hyperparameters may include any one or any combination of any two or more of a kernel size, a maximum number of layers, a minimum layer depth, a maximum layer depth, a total number of repetitions, a total number of cases, a reduced number of layers, and a reduced number of channels.

The repetition-reduction block may be stacked in accordance with a longitudinal direction and a lateral direction.

The preset reduction layer may correspond to a layer having a 1×1 kernel size.

The preset reduction layer may be configured to reduce a number of multiple channels stacked to correspond to the feature map by the reduced number of channels.

In accordance with another aspect of the present invention to accomplish the above objects, there is provided a neural-network-lightening apparatus, including a Condensed Decoding Connection (CDC) for stacking (accumulating) an output layer (value) of either one or both of a layer constituting a neural network and a repetition-reduction block; a reduction layer having a 1×1 kernel size; and a processor for stacking the output layer in the CDC, and lightening the neural network by reducing a feature map generated to correspond to data stacked in the CDC based on the reduction layer.

The repetition-reduction block may correspond to a section in which layer reduction and layer expansion are repeatedly performed so that each of multiple block sections classified into block units depending on preset classification conditions, in an entire architecture of the neural network, is capable of exhibiting optimal performance.

The processor may generate a repetition-reduction block candidate group based on setting of hyperparameters for respective multiple block sections, and selects any one repetition-reduction block candidate having optimal performance as the repetition-reduction block from the repetition-reduction block candidate group based on a performance evaluation.

The repetition-reduction block candidate group may include multiple repetition-reduction block candidates having different values of the hyperparameters.

The processor may be configured to, when the neural network is a previously developed neural network that is not configured using block units, classify the previously developed neural network into block units based on the preset classification conditions.

The preset classification conditions may include any one or any combination of any two or more of a first classification condition which classifies multiple consecutive convolution layers based on sub-sampling layers, a second classification condition which classifies multiple consecutive convolution layers based on layers having a skip connection, a third classification condition which classifies multiple consecutive convolution layers, which do not include sub-sampling layers, based on a preset consecutive number of times, a fourth classification condition which classifies depth concatenations between layers as a single block section, and a fifth classification condition which classifies convolution layers based on layers having different properties from the multiple consecutive convolution layers.

The hyperparameters may include any one or any combination of any two or more of a kernel size, a maximum number of layers, a minimum layer depth, a maximum layer depth, a total number of repetitions, a total number of cases, a reduced number of layers, and a reduced number of channels.

The repetition-reduction block may be stacked in accordance with a longitudinal direction and a lateral direction.

The preset reduction layer may be configured to reduce a number of multiple channels stacked to correspond to the feature map by the reduced number of channels.

BRIEF DESCRIPTION OF THE DRAWINGS

The above and other objects, features and advantages of the present invention will be more clearly understood from the following detailed description taken in conjunction with the accompanying drawings, in which:

FIGS. 11 and 12 are diagrams illustrating an embodiment in which neural-network-lightening is performed according to the present invention;

DESCRIPTION OF THE PREFERRED EMBODIMENTS

Figure 1:
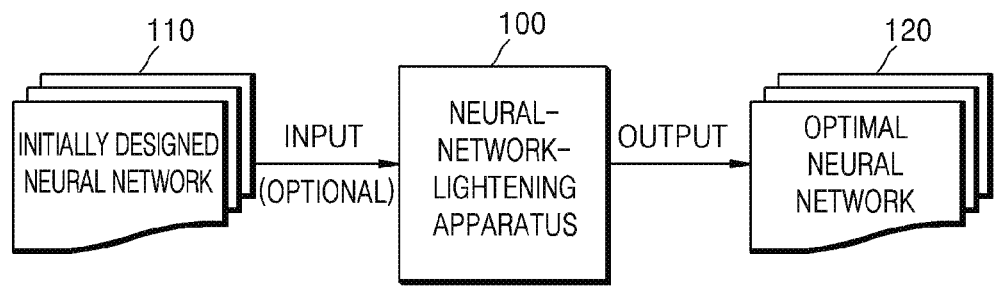
FIGS. 1 and 2 are diagrams illustrating a neural-network-lightening system according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, preferred embodiments of the present invention will be described in detail with reference to the attached drawings.

Figure 2:
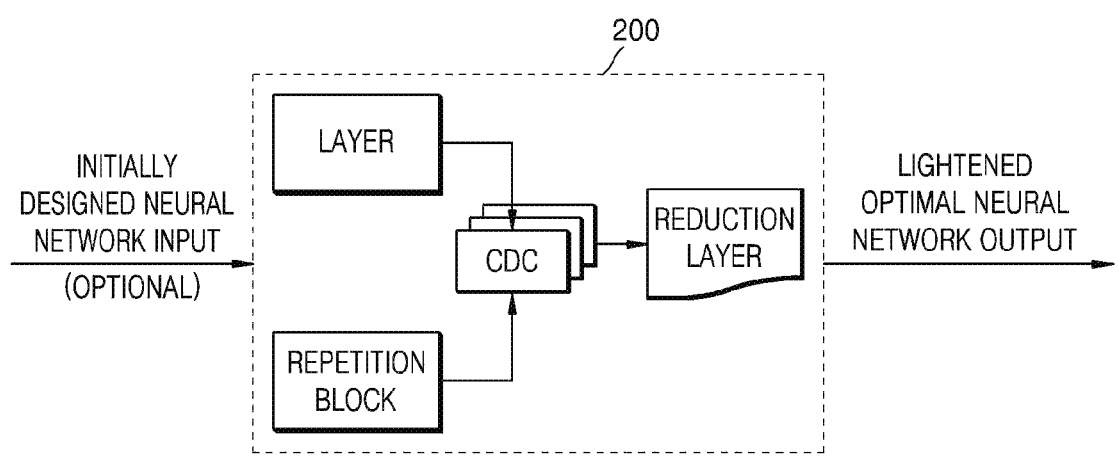

FIGS. 1 and 2 are diagrams illustrating a neural-network-lightening system according to an embodiment of the present invention.

First, referring to FIG. 1, in the neural-network-lightening system according to the embodiment of the present invention, the designer of a neural network may design a neural network in a dense architecture in accordance with application fields. In this case, the designer may design a neural network in the most complicated and inclusive architecture within a design range. That is, a sufficiently large neural network may be designed such that the designer can obtain desired performance, and a network size may not be taken into consideration with respect to design directions other than design performance.

In this way, an initially designed neural network 110 may be input to a neural-network-lightening apparatus 100 according to the embodiment of the present invention, and may then be lightened in the form of an optimal neural network 120.

For example, referring to FIG. 2, when a neural network initially designed to have a sufficiently large architecture is input to a neural-network-lightening apparatus 200 according to an embodiment of the present invention, an output layer of either one or both of each layer constituting the input network and the repetition-reduction block may be stacked in a Condensed Decoding Connection (CDC).

Although, in the present invention, the input neural network is not the initially designed neural network 110, a previously developed neural network may be input to the lightening apparatus 100, and may then be lightened in the form of the optimal neural network 120.

Thereafter, the neural-network-lightening apparatus 200 reduces a feature map, generated based on pieces of data stacked in the CDC depending on the reduction layer, thus lightening the neural network.

Figure 3:
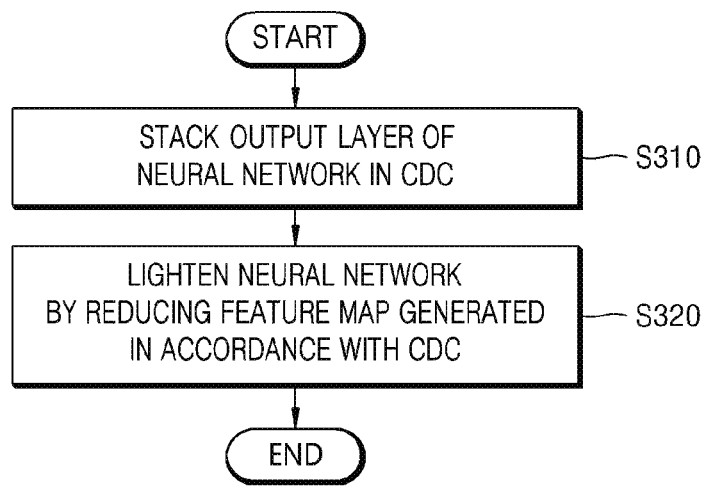
FIG. 3 is an operation flowchart illustrating a neural-network-lightening method according to an embodiment of the present invention.

FIG. 3 is an operation flowchart illustrating a neural-network-lightening method according to an embodiment of the present invention.

Referring to FIG. 3, the neural-network-lightening method according to the embodiment of the present invention may stack the output layer of either one or both of a layer, which constitutes a neural network, and a repetition-reduction block in a Condensed Decoding Connection (CDC) at step S310.

Figure 14:
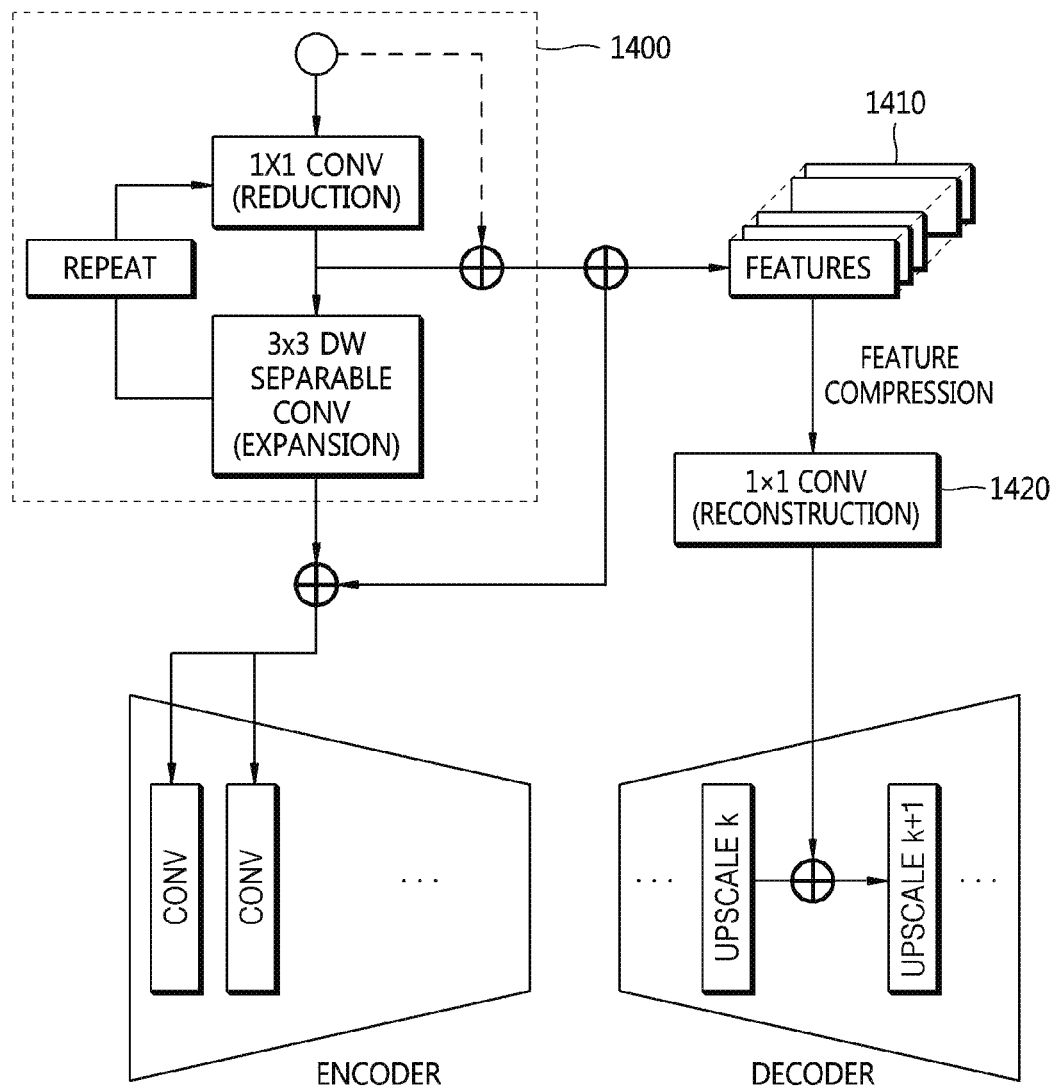
FIG. 14 is a diagram illustrating a neural-network-lightening architecture according to an embodiment of the present invention.

For example, in the case of the repetition-reduction block, as illustrated in FIG. 14, outputs reduced to 1×1 convolution may be stacked in a CDC 1410. The number of long channels formed when outputs are stacked in the CDC 1410 in this way may be reduced to the reduced number of layers (rcn) corresponding to hyperparameters, and this procedure will be described with reference to step S320.

In this case, the outputs stacked in the CDC may also include outputs from at least one layer constituting the neural network in addition to the output layer of a repetition-reduction block 1400, such as that shown in FIG. 14.

That is, a large amount of information may be stacked in the CDC, and may then be reduced, thus enabling the neural network to have a lightweight network architecture having a low computational load while maintaining performance.

Here, the repetition-reduction block may correspond to a section in which layer reduction and layer expansion are repeatedly performed so that multiple block sections, classified into block units depending on preset classification conditions in the entire architecture of the neural network, may each exhibit optimal performance.

For example, for the neural network composed of block units, a repetition-reduction block may be generated in such a way that reduction layers having optimal performance for respective multiple block sections, classified into block units are stacked for respective layers.

That is, the blocks may refer to layer chunk in which specific output layers are concatenated.

Here, although not illustrated in FIG. 3, the neural-network-lightening method according to the embodiment of the present invention may generate repetition-reduction block candidate groups based on the setting of hyperparameters for respective multiple block sections, and may select any one repetition-reduction block candidate having optimal performance, as the repetition-reduction block, from the corresponding repetition-reduction block candidate group, based on repeated performance evaluation.

Here, performance evaluation may be performed in such a way that layer reduction is performed to correspond to a 1×1 kernel size and layer expansion is performed to correspond to a 3×3 kernel size.

Figure 7:
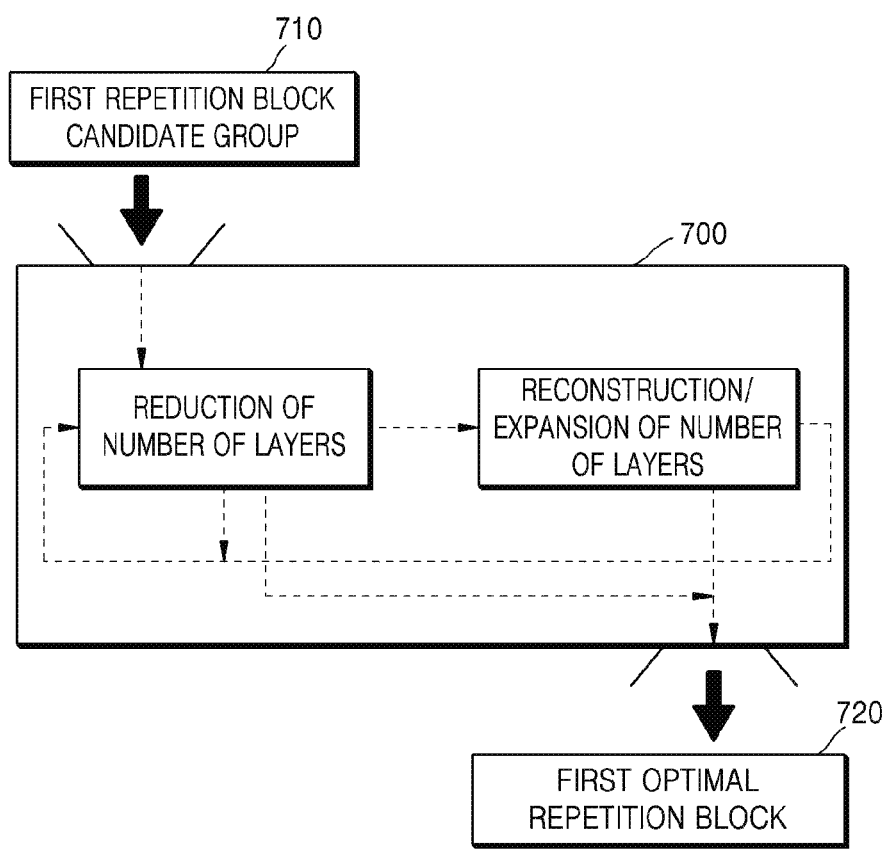
FIG. 7 is a diagram illustrating an example of a procedure for selecting a repetition-reduction block based on performance evaluation of a repetition-reduction block candidate group according to the present invention.

For example, as illustrated in FIG. 7, one or more repetition-reduction block candidate groups are sequentially input to a performance evaluation module 700 according to an embodiment of the present invention, and thus the repetition-reduction block may be selected. That is, when a first repetition-reduction block candidate group 710 is input, performance evaluation may be performed while reduction of a layer depth and expansion for layer reconstruction are repeated depending on the design schema of the repetition-reduction block. Thereafter, a first repetition-reduction block for which performance has been optimized may be selected from the first repetition-reduction block candidate group 710. This procedure is performed on each of the one or more repetition-reduction block candidate groups, and thus at least one repetition-reduction block that will constitute the neural network may be selected.

Such a repetitive performance evaluation may correspond to a procedure of evaluating the performance of the corresponding block while repeatedly performing reduction of a layer depth and expansion for layer reconstruction based on hyperparameters. By means of this procedure, the design of a repetition-reduction block having optimal performance may be found.

That is, in accordance with the present invention, because hyperparameters of respective repetition-reduction blocks included in the repetition-reduction block candidate group are limitedly determined in consideration of parameter values of a previous layer or a previous repetition-reduction block candidate, the number of cases for designing the repetition-reduction block may be strongly limited. Therefore, for each repetition-reduction block candidate group, the time needed to explore the optimal design may be reduced.

Here, each repetition-reduction block candidate group may include multiple repetition-reduction block candidates having different hyperparameter values.

Here, multiple repetition-reduction block candidates may be generated within a limited range due to hyperparameters.

Here, the hyperparameters may include any one or any combination of any two or more of a kernel size, the maximum number of layers, a minimum layer depth, a maximum layer depth, the total number of repetitions, the total number of cases, the reduced number of layers, and the reduced number of channels.

For example, the kernel size may be chiefly selected as 1 and 3 which are known as the sizes of most effective kernels among kernels selected by an inception module or the like.

Further, the maximum number of layers MAX_RRBLK may correspond to the sum of the total number of convolution layers, strides of which are greater than 1, and the total number of special layers, differing from those of a convolution effect.

Further, the minimum layer depth MIN_RD denotes the number of layers corresponding to the minimum depth of a block, and the minimum layer depth may be set to the minimum value, among the depths of previous layers that are stacked, in the case of a first repetition-reduction block candidate. Further, in the case of repetition-reduction blocks other than the first repetition-reduction block candidate, the minimum layer depth may be set to a value obtained by multiplying 2 by the smallest depth value, among the depth values of previous repetition-reduction block candidates. Such a minimum layer depth may be represented by the following Equation (1):

$$\min\_Rd = \min\_depth_{prev\_complex} * 2 \text{ (when there is a previous repetition-reduction block candidate)}$$

$$\min\_Rd = \min\_depth_{prev\_all\_layers} \text{ (in case of a first repetition-reduction block candidate)}$$

$$\min\_Rd_{next} = \min\_Rd_{prev} * 2$$

$$\min\_R < \max\_Rd \quad (1)$$

Also, the maximum layer depth MAX_RD denotes the number of layers corresponding to the maximum depth of a block, and the maximum feature depth value, among depth values of respective layers of multiple repetition-reduction block candidates, may correspond to the maximum layer depth. However, the maximum layer depth cannot be less than a value obtained by multiplying 2 by the minimum layer depth. Such a maximum layer depth may be represented by the following Equation (2):

$$\max\_Rd = \max\_depth_{packed\_layers}$$

$$\max\_Rd_{next} = \max\_Rd_{prev}/2$$

$$\min\_Rd * 2 \; \max\_Rd \le \max\_depth_{packed\_layers} \quad (2)$$

Also, the total number of repetitions (REPETITION) may be a value meaning the total number of repetitions of the corresponding repetition-reduction block candidate depending on the minimum layer depth and the maximum layer depth, and may be set to an integer value falling within a range from a minimum of 1 to a value obtained by dividing the total number of layers of the repetition-reduction block candidate by 2 and rounding off the resulting value. Here, the number of repetitions may start from the minimum value, and may be gradually increased until required performance is secured, and thus the scale of the neural network may be increased to a level that is needed. The total number of repetitions may be represented by the following Equation (3):

$$1 \le \text{reptition} \le \left\lceil \frac{\text{packed\_layers}}{2} \right\rceil \left\lceil \frac{\text{packed\_layers}}{2} \right\rceil \quad (3)$$

Also, the total number of cases TC_RRBLK may be a value meaning the total number of cases which can be attempted in a single repetition-reduction block candidate. Here, assuming that the total number of possible cases that are made at the maximum layer depth is C, the total number of cases may be limited to C C(+½). The total number of cases may be represented by the following Equation (4):

$$tc\_RRblk = C*(C+1)/2 \text{ (maximum value that can be taken by } C \text{ is } \log_2\max\_Rd) \quad (4)$$

In particular, the kernel size and the total number of repetitions may play important roles.

Here, the repetition-reduction block may be composed of a layer having a 1×1 kernel size and a layer having a 3×3 kernel size, and may use the output layer of the 1×1 kernel layer as a skip connection.

Here, the repetition-reduction block may be stacked in the CDC in accordance with a lateral direction and a longitudinal direction.

Here, when the repetition-reduction block is stacked in a longitudinal direction, the depth of the network may be increased, whereas when the repetition-reduction block is stacked in a lateral direction, the width of the network may be increased.

Figure 8:
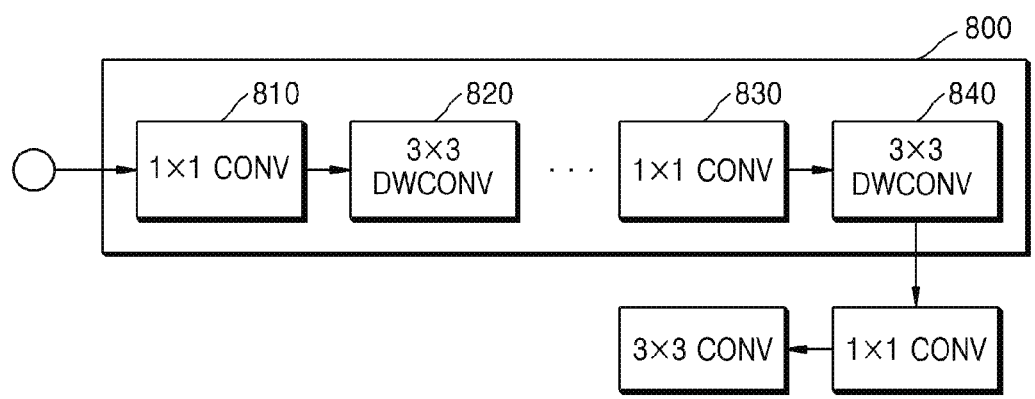
FIG. 8 is a diagram illustrating an example of a lateral repetition block according to the present invention.

For example, referring to FIG. 8, a lateral repetition block 800 has a continuously laterally widened shape because 1×1 convolution layers 810 and 830 and 3×3 depthwise separable (DW) convolution layers 820 and 840, which perform depthwise separable convolutional calculation, are repeated. In this case, after the input size of the lateral repetition block 800 is finally adjusted to a 1×1 kernel size, the input size-adjusted lateral repetition block may then be handed over, at a 3×3 kernel size, to a decoder stage, or a next block may be started. Alternatively, the input size of the lateral repetition block 800 may be adjusted based on the skip connection of a 1×1 kernel size, and then the input-sized adjusted block may be delivered to the input of the decoder stage.

That is, the preceding 1×1 convolution layer 810 and the 3×3 DW convolution layer 820 may correspond to a section in which reduction and expansion are repeated, and the subsequent 1×1 convolution layer 830 may be a section corresponding to a skip connection, and may function to deliver information to a next block or the decoder stage.

Here, DW convolution is widely used in lightweight neural network design, and consists of two consecutive layers, depthwise convolution and a 1×1 convolution. Because each input channel performs a convolution by corresponding to a single depth filter of weight, DW convolutional calculation may be performed with less computation and parameters than conventional convolutions.

Here, in the case of each of the 3×3 DW convolution layers 820 and 840, respective channels of the corresponding layers and weights may perform depthwise separable convolutional calculation at a depth of 1.

Here, a 1×1 convolution layer disposed outside the lateral repetition block 800 may also be applied so as to adjust the kernel size of the 3×3 DW convolution layer 840. Further, when the decoder stage is present, the presence of the last 3×3 convolution layer may be regarded as being a more effective structure. In contrast, when no decoder stage is present, execution of a 3×3 DW convolution layer other than a 3×3 convolution layer may be more effective.

Figure 9:
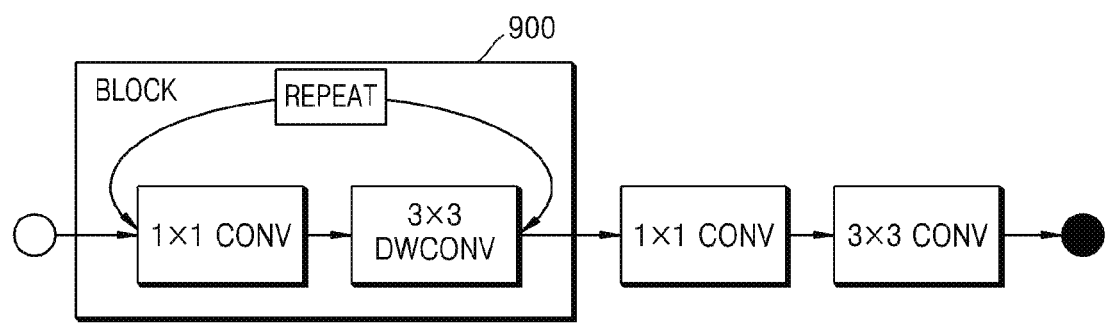
FIGS. 9 and 10 are diagrams illustrating an example of a longitudinal repetition block according to the present invention.
Figure 10:
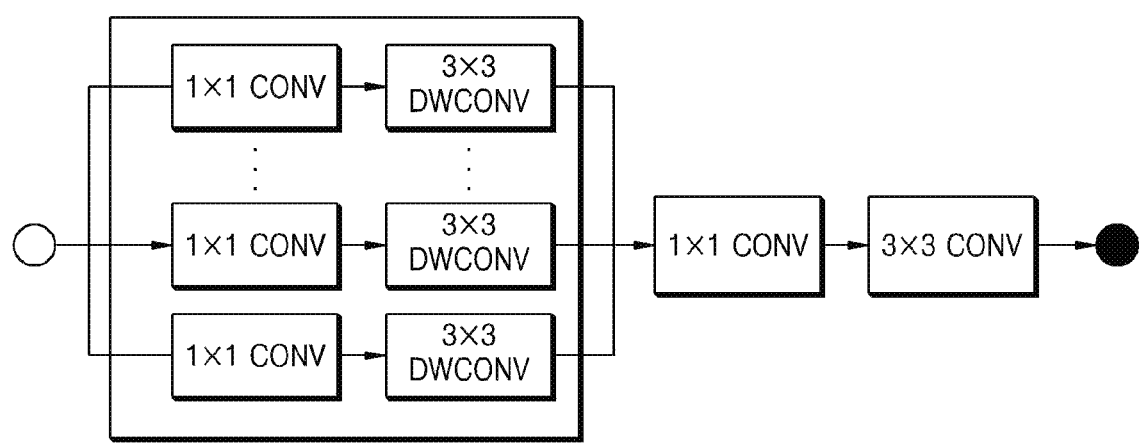

In another example, referring to FIG. 9, a longitudinal repetition block 900 may allow the depth of a network to further increase in the form illustrated in FIG. 10.

Here, a value output from the repetition-reduction block may be input to any one of a next layer and the decoder.

In this way, since the repetition-reduction block according to the embodiment of the present invention may stack without being limited to a longitudinal direction or a lateral direction, it may be used to lighten networks having a wider variety of architectures.

Next, the neural-network-lightening method according to the embodiment of the present invention may lighten the neural network by reducing a feature map generated in accordance with data stacked in the CDC based on a preset reduction layer at step S320.

Here, the preset reduction layer may be a layer having a 1×1 kernel size.

For example, referring to FIG. 14, a CDC 1410 may generate a feature map corresponding to stacked data. The feature map generated in this way may be reduced through a reduction layer 1420 having a 1×1 kernel size, and may then be delivered to a decoder network.

Here, the preset reduction layer may reduce multiple channels stacked in accordance with the feature map by the reduced number of channels.

Figure 5:
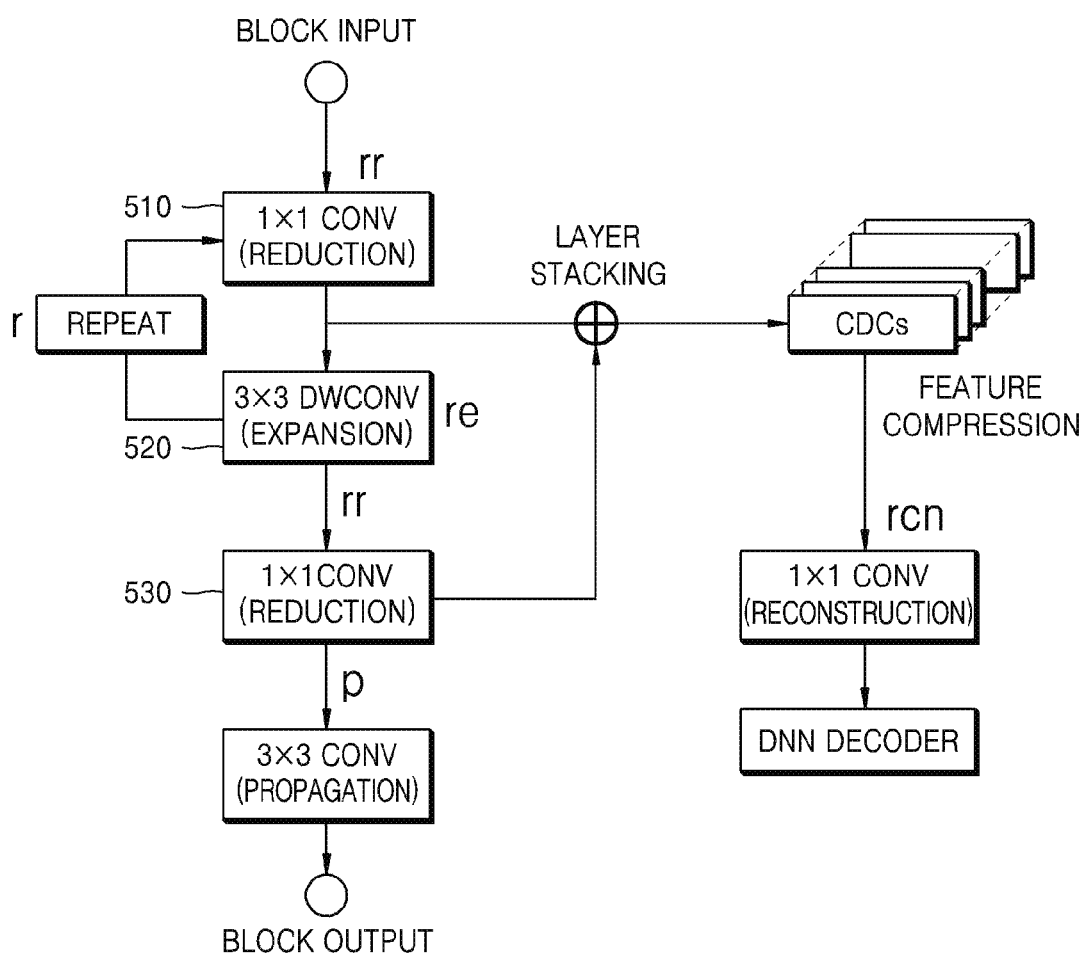

For example, referring to FIG. 5, the reduction layer may reduce the multiple channels stacked in the CDC to channels corresponding to a hyperparameter corresponding to the reduced number of channels (rcn), thus lightening the neural network to an extent corresponding to the rcn.

Here, the difference between the model sizes of the neural network before being lightened and the lightened (lightweight) neural network may fall within a preset range.

For example, referring to FIGS. 11 and 12, an embodiment in which a depth estimation algorithm for measuring a distance from a 2D image is remodeled to a neural-network-lightening algorithm according to an embodiment of the present invention is illustrated. Here, the network illustrated in FIG. 11 may correspond to an existing algorithm, and the network illustrated in FIG. 12 may correspond to an algorithm which lightens a neural network based on a repetition-reduction block according to the embodiment of the present invention.

In FIG. 11, when preset classification conditions are applied to the present invention, a first convolution layer Conv1 immediately meets a pooling layer Pool1 right after Conv1, and thus Conv1 is too small to be bound as a block, so Conv1 is not set to a block section. Similarly, a second convolution layer Conv2 may not be set to a block section for the same reason as Conv1.

However, since each of a third convolution layer Conv3, a fourth convolution layer Conv4, and a fifth convolution layer Conv5 has two consecutive layers, Conv3, Conv4, and Conv5 may be set to respective block sections 1110, 1120, and 1130.

Therefore, in the block sections 1110, 1120, and 1130, a repetition-reduction block based on performance evaluation may be selected, and the neural network may be lightened in a form in which repetition-reduction blocks 1210, 1220, and 1230 are applied, as illustrated in FIG. 12.

Referring to FIGS. 11 and 12, it can be seen that, when the neural network is lightened using a repetition-reduction block, model information may be enriched, and performance may be improved, whereas the model sizes are scarcely changed.

Figure 15:
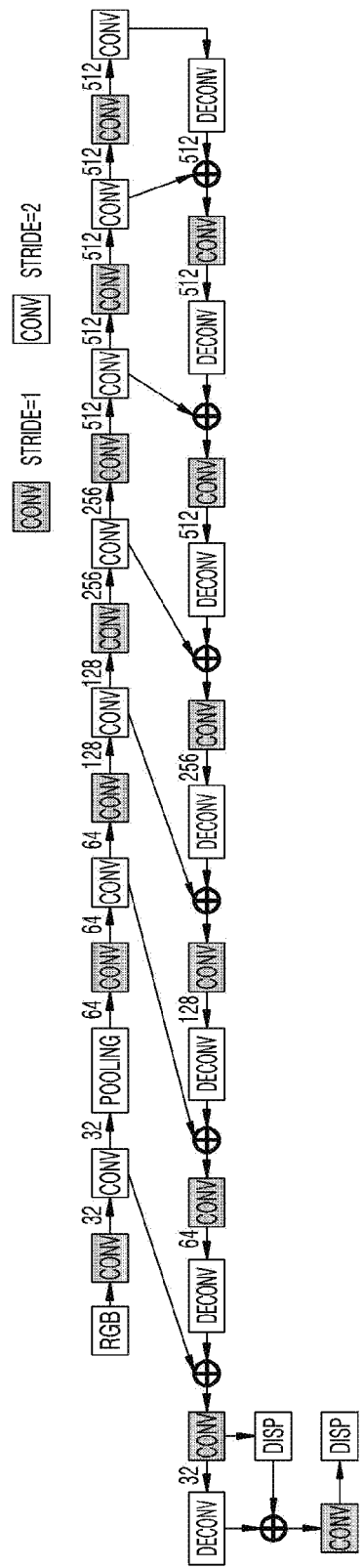
FIGS. 15 and 16 are diagrams illustrating an example in which a network is lightened through a neural-network-lightening method according to an embodiment of the present invention.
Figure 16:
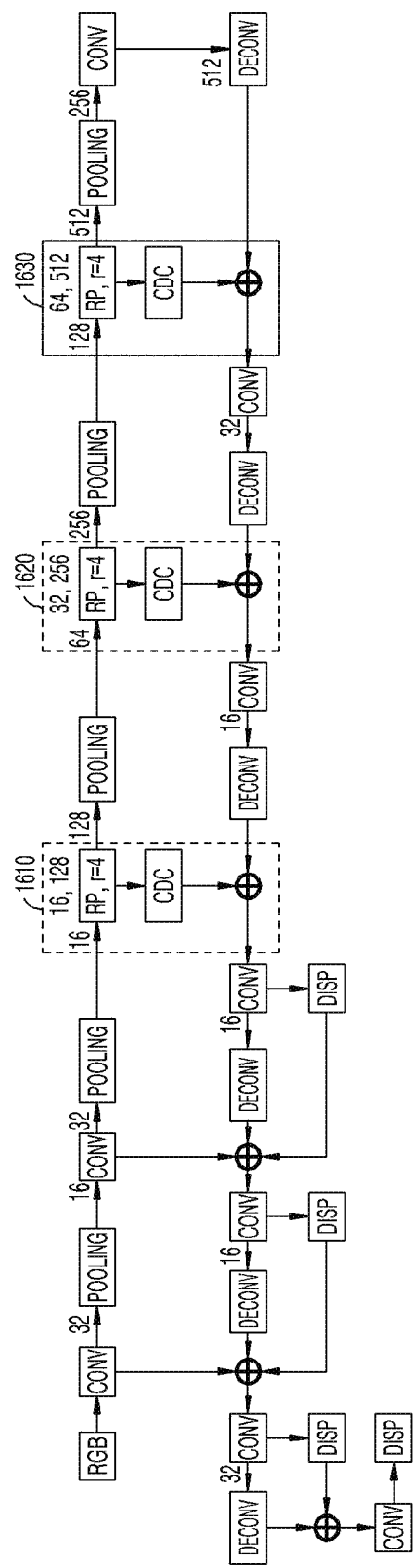

Also, referring to FIGS. 15 and 16, a neural network architecture before being lightened may be compared with a neural network architecture after being lightened according to the embodiment of the present invention.

First, referring to FIG. 15, it can be seen that the neural network before being lightened is structurized in a form in which multiple convolution layers are repeatedly arranged. When such a neural network is input to the neural-network-lightening apparatus according to the embodiment of the present invention, the neural network may be lightened to an architecture such as that illustrated in FIG. 16.

That is, in the section in which multiple convolution layers are repeated in FIG. 15, repetition block sections 1610, 1620, and 1630 based on repetition blocks are created, and the output layers of the repetition block sections 1610, 1620, and 1630 are stacked in the CDC to reduce the layers, and thus it can be seen that the entire network architecture is simplified more than that of FIG. 15.

In this way, as the network architecture is simplified, a network computational load may be reduced while network performance may be maintained, and thus an effective network design may be implemented.

Also, although not illustrated in FIG. 3, the neural-network-lightening method according to the embodiment of the present invention is configured to, when the neural network is a previously developed neural network that is not configured using block units, classify the previously developed neural network into block units based on preset classification conditions.

That is, the previously developed neural network, which is input for lightening, is designed in a sufficiently large and complicated state to meet the designer's purpose. Accordingly, in order to lighten the neural network, a block section to which repetition-reduction blocks that can be regarded as blocks for performing reduction and reconstruction are to be applied may be classified.

Here, the preset classification conditions may include any one or any combination of any two or more of a first classification condition which classifies multiple consecutive convolution layers based on sub-sampling layers, a second classification condition which classifies multiple consecutive convolution layers based on layers having a skip connection, a third classification condition which classifies multiple consecutive convolution layers, which do not include sub-sampling layers, based on the preset consecutive number of times, a fourth classification condition which classifies depth concatenations between layers as a single block section, and a fifth classification condition which classifies convolution layers based on layers having different properties from multiple consecutive convolution layers.

Figure 4:
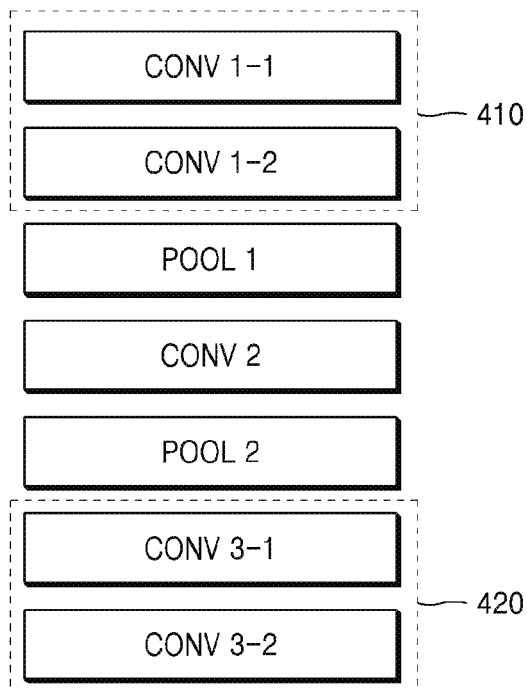
FIGS. 4 to 6 are diagrams illustrating an example of a procedure for classifying block sections according to the present invention.

For example, as illustrated in FIG. 4, it may be assumed that consecutive convolution layers are present, and that a sub-sampling layer, such as a pooling layer, is present between the convolution layers. In this case, based on the first classification condition, block sections 410 and 420 may be classified based on the sub-sampling layer.

Here, the sub-sampling layer may include a max pooling layer, an average pooling layer, etc.

However, when a convolution layer is a single layer rather than consecutive layers, as in the case of Conv2 illustrated in FIG. 4, the convolution layer may not be classified as a block section.

In another example, referring to FIG. 5, when there are convolution layers 510 and 520 having a residual skip connection, previous layers including the skip connection may be classified as a single block section by using a layer having the skip connection as a boundary, based on the second classification condition. Here, major parameters illustrated in FIG. 5 may correspond to a reduction parameter rr, an expansion parameter re, and a repetition parameter r, respectively, and various encoder/decoder models having deep and rich structures may be created by means of these parameters. Here, respective outputs resulting from repetitions may be stacked in CDCs, as illustrated in FIG. 5, or may be sent to a 1×1 convolution layer 530 so that they are transmitted to the decoder. Here, the CDCs may correspond to a bundle of various features extracted through encoding.

In a further example, when the number of layers corresponding to consecutive convolution layers is large, and it is difficult to classify block sections based only on sub-sampling layers, the consecutive convolution layers may be divided based on the preset consecutive number of times depending on the third classification condition, and may then be classified as block sections.

In this case, even if there are differences in the depth designs of network architecture layers, an output depth having a pervasive feature may be primarily classified.

Describing a computationally intensive section of YOLO v2, which is an object recognition model, by way of example, a pervasive depth may be set to 512 and 1024, and then block sections may be classified in a structure corresponding to 512-1024-512-1024-512-1024-1024-1024-64-1024 based on the output depth. Here, the block sections may be respectively classified to correspond to (512-1024-512-1024-512) and (1024-1024-1024-64-1024).

Figure 6:
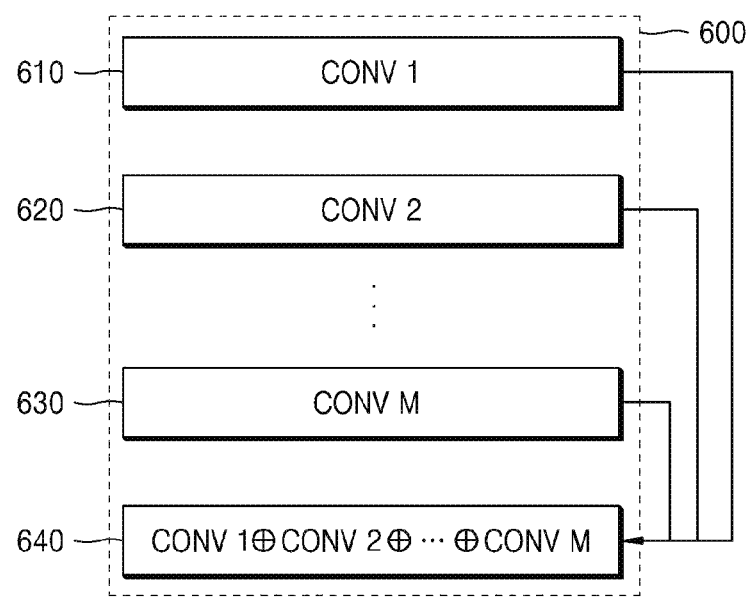

In yet another example, as illustrated in FIG. 6, if N convolution layers 610, 620, 630, and 640 have depth concatenation sections, convolution layers included in the corresponding sections may be classified as a single block section based on the fourth classification condition.

In still another example, when there is a layer having features to which other properties are added, unlike the consecutive convolution layers, block sections may be classified based on the corresponding layer depending on the fifth classification condition.

Further, although not illustrated in FIG. 3, in the neural-network-lightening method according to the embodiment of the present invention, various types of information generated in the neural-network-lightening process according to embodiment of the present invention may be stored in a separate storage module, as described above.

When the neural-network-lightening method according to the embodiment of the present invention is used, the present invention may design a network that enables fast calculation despite imposing only a low computational load and has a low power consumption architecture by reducing the design exploration range of a neural network.

Further, the present invention may remodel a conventionally published network so that the network has low power consumption, light weight, and high-speed architecture, and may design a neural network having a suitable depth level based on a repetition block, thus preventing a computational load from excessively increasing.

Furthermore, the neural-network-lightening method according to the embodiment of the present invention may be universally applied to the design of a deep learning structure based on Convolutional Neural Networks (CNNs), and may also be applied to Artificial Intelligence (AI), in particular, the entire deep learning fields including images.

Figure 13:
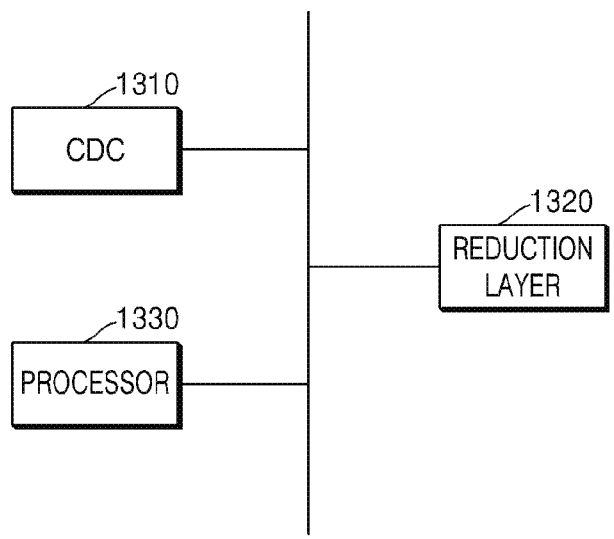
FIG. 13 is a block diagram illustrating a neural-network-lightening apparatus according to an embodiment of the present invention.

FIG. 13 is a block diagram illustrating a neural-network-lightening apparatus according to an embodiment of the present invention.

Referring to FIG. 13, the neural-network-lightening apparatus according to the embodiment of the present invention may include a CDC 1310, a reduction layer 1320, and a processor 1330.

The processor 1330 may stack the output layer of either one or both of a layer constituting a neural network and a repetition-reduction block in a Condensed Decoding Connection (CDC) 1310.

Here, the CDC 1310 may stack the output layer of either one or both of a layer constituting a neural network and a repetition-reduction block.

For example, in the case of the repetition-reduction block, as illustrated in FIG. 14, outputs reduced to 1×1 convolution may be stacked in a CDC 1410. The number of long channels formed when outputs are stacked in the CDC 1410 in this way may be reduced to the reduced number of layers (rcn) corresponding to hyperparameters, and this procedure will be described with reference to step S320.

In this case, the outputs stacked in the CDC may also include outputs from at least one layer constituting the neural network in addition to the output layer of a repetition-reduction block 1400, such as that shown in FIG. 14.

That is, a large amount of information may be stacked in the CDC, and may then be reduced, thus enabling the neural network to have a lightweight network architecture having a low computational load while maintaining performance.

Here, the repetition-reduction block may correspond to a section in which layer reduction and layer expansion are repeatedly performed so that multiple block sections, classified into block units depending on preset classification conditions in the entire architecture of the neural network, may each exhibit optimal performance.

For example, for the neural network composed of block units, a repetition-reduction block may be generated in such a way that reduction layers having optimal performance for respective multiple block sections, classified into block units are stacked for respective layers.

Also, the processor 1330 may generate repetition-reduction block candidate groups based on the setting of hyperparameters for respective multiple block sections, and may select any one repetition-reduction block candidate having optimal performance, as the repetition-reduction block, from the corresponding repetition-reduction block candidate group, based on repeated performance evaluation.

Here, performance evaluation may be performed in such a way that layer reduction is performed to correspond to a 1×1 kernel size and layer expansion is performed to correspond to a 3×3 kernel size.

For example, as illustrated in FIG. 7, one or more repetition-reduction block candidate groups are sequentially input to a performance evaluation module 700 according to an embodiment of the present invention, and thus the repetition-reduction block may be selected. That is, when a first repetition-reduction block candidate group 710 is input, performance evaluation may be performed while reduction of a layer depth and expansion for layer reconstruction are repeated depending on the design schema of the repetition-reduction block. Thereafter, a first repetition-reduction block for which performance has been optimized may be selected from the first repetition-reduction block candidate group 710. This procedure is performed on each of the one or more repetition-reduction block candidate groups, and thus at least one repetition-reduction block that will constitute the neural network may be selected.

Such a repetitive performance evaluation may correspond to a procedure of evaluating the performance of the corresponding block while repeatedly performing reduction of a layer depth and expansion for layer reconstruction based on hyperparameters. By means of this procedure, the design of a repetition-reduction block having optimal performance may be found.

That is, in accordance with the present invention, because hyperparameters of respective repetition-reduction blocks included in the repetition-reduction block candidate group are limitedly determined in consideration of parameter values of a previous layer or a previous repetition-reduction block candidate, the number of cases for designing the repetition-reduction block may be strongly limited. Therefore, for each repetition-reduction block candidate group, the time needed to explore the optimal design may be reduced.

Here, each repetition-reduction block candidate group may include multiple repetition-reduction block candidates having different hyperparameter values.

Here, multiple repetition-reduction block candidates may be generated within a limited range due to hyperparameters.

Here, the hyperparameters may include any one or any combination of any two or more of a kernel size, the maximum number of layers, a minimum layer depth, a maximum layer depth, the total number of repetitions, the total number of cases, the reduced number of layers, and the reduced number of channels.

For example, the kernel size may be chiefly selected as 1 and 3 which are known as the sizes of most effective kernels among kernels selected by an inception module or the like.

Further, the maximum number of layers MAX_RRBLK may correspond to the sum of the total number of convolution layers, strides of which are greater than 1, and the total number of special layers, differing from those of a convolution effect.

Further, the minimum layer depth MIN_RD denotes the number of layers corresponding to the minimum depth of a block, and the minimum layer depth may be set to the minimum value, among the depths of previous layers that are stacked, in the case of a first repetition-reduction block candidate. Further, in the case of repetition-reduction blocks other than the first repetition-reduction block candidate, the minimum layer depth may be set to a value obtained by multiplying 2 by the smallest depth value, among the depth values of previous repetition-reduction block candidates. Such a minimum layer depth may be represented by the following Equation (1):

$$\min\_Rd = \min\_depth_{prev\_complex} * 2 \text{ (when there is a previous repetition-reduction block candidate)}$$

$$\min\_R = \min\_depth_{prev\_all\_layers} \text{ (in case of a first repetition-reduction block candidate)}$$

$$\min\_Rd_{next} = \min\_Rd_{prev} * 2$$

$$\min\_Rd < \max\_Rd \qquad (1)$$

Also, the maximum layer depth MAX_RD denotes the number of layers corresponding to the maximum depth of a block, and the maximum feature depth value, among depth values of respective layers of multiple repetition-reduction block candidates, may correspond to the maximum layer depth. However, the maximum layer depth cannot be less than a value obtained by multiplying 2 by the minimum layer depth. Such a maximum layer depth may be represented by the following Equation (2):

$$\max\_Rd = \max\_depth_{packed\_layers}$$

$$\max\_Rd_{next} = \max\_Rd_{prev}/2$$

$$\min\_Rd * 2 \leq \max\_Rd \leq \max\_depth_{packed\_layers} \qquad (2)$$

Also, the total number of repetitions (REPETITION) may be a value meaning the total number of repetitions of the corresponding repetition-reduction block candidate depending on the minimum layer depth and the maximum layer depth, and may be set to an integer value falling within a range from a minimum of 1 to a value obtained by dividing the total number of layers of the repetition-reduction block candidate by 2 and rounding off the resulting value. Here, the number of repetitions may start from the minimum value, and may be gradually increased until required performance is secured, and thus the scale of the neural network may be increased to a level that is needed. The total number of repetitions may be represented by the following Equation (3):

$$1 \leq \text{reptition} \leq \left\lceil \frac{\text{packed\_layers}}{2} \right\rceil \left\lceil \frac{\text{packed\_layers}}{2} \right\rceil \qquad (3)$$

Also, the total number of cases TC_RRBLK may be a value meaning the total number of cases which can be attempted in a single repetition-reduction block candidate. Here, assuming that the total number of possible cases that are made at the maximum layer depth is C, the total number of cases may be limited to $C*C(+\frac{1}{2})$. The total number of cases may be represented by the following Equation (4):

$$tc\_RRblk = C*(C+1)/2 \text{ (maximum value that can be taken by } C \text{ is } \log_2 \max\_Rd) \qquad (4)$$

In particular, the kernel size and the total number of repetitions may play important roles.

Here, the repetition-reduction block may be composed of a layer having a 1×1 kernel size and a layer having a 3×3 kernel size, and may use the output layer of the 1×1 kernel layer as a skip connection.

Here, the repetition-reduction block may be stacked in the CDC in accordance with a lateral direction and a longitudinal direction.

Here, when the repetition-reduction block is stacked in a longitudinal direction, the depth of the network may be increased, whereas when the repetition-reduction block is stacked in a lateral direction, the width of the network may be increased.

For example, referring to FIG. 8, a lateral repetition block 800 has a continuously laterally widened shape because 1×1 convolution layers 810 and 830 and 3×3 depthwise separable (DW) convolution layers 820 and 840, which perform depthwise separable convolutional calculation, are repeated. In this case, after the input size of the lateral repetition block 800 is finally adjusted to a 1×1 kernel size, the input size-adjusted lateral repetition block may then be handed over, at a 3×3 kernel size, to a decoder stage, or a next block may be started. Alternatively, the input size of the lateral repetition block 800 may be adjusted based on the skip connection of a 1×1 kernel size, and then the input-sized adjusted block may be delivered to the input of the decoder stage.

That is, the preceding 1×1 convolution layer 810 and the 3×3 DW convolution layer 820 may correspond to a section in which reduction and expansion are repeated, and the subsequent 1×1 convolution layer 830 may be a section corresponding to a skip connection, and may function to deliver information to a next block or the decoder stage.

Here, in the case of each of the 3×3 DW convolution layers 820 and 840, respective channels of the corresponding layers and weights may perform depthwise separable convolutional calculation at a depth of 1.

Here, a 1×1 convolution layer disposed outside the lateral repetition block 800 may also be applied so as to adjust the kernel size of the 3×3 DW convolution layer 840. Further, when the decoder stage is present, the presence of the last 3×3 convolution layer may be regarded as being a more effective structure. In contrast, when no decoder stage is present, execution of a 3×3 DW convolution layer other than a 3×3 convolution layer may be more effective.

In another example, referring to FIG. 9, a longitudinal repetition block 900 may allow the depth of a network to further increase in the form illustrated in FIG. 10.

Here, a value output from the repetition-reduction block may be input to any one of a next layer and the decoder.

In this way, since the repetition-reduction block according to the embodiment of the present invention may stack without being limited to a longitudinal direction or a lateral direction, it may be used to lighten networks having a wider variety of architectures.

Further, the processor 1330 may lighten the neural network by reducing a feature map generated in accordance with data stacked in the CDC based on a preset reduction layer 1320.

Here, the preset reduction layer 1320 may be a layer having a 1×1 kernel size.

For example, referring to FIG. 14, a CDC 1410 may generate a feature map corresponding to stacked data. The feature map generated in this way may be reduced through a reduction layer 1420 having a 1×1 kernel size, and may then be delivered to a decoder network.

Here, the preset reduction layer may reduce multiple channels stacked in accordance with the feature map by the reduced number of channels.

For example, referring to FIG. 5, the reduction layer may reduce the multiple channels stacked in the CDC to channels corresponding to a hyperparameter corresponding to the reduced number of channels (rcn), thus lightening the neural network to an extent corresponding to the rcn.

Here, the difference between the model sizes of the neural network before being lightened and the lightened (lightweight) neural network may fall within a preset range.

For example, referring to FIGS. 11 and 12, an embodiment in which a depth estimation algorithm for measuring a distance from a 2D image is remodeled to a neural-network-lightening algorithm according to an embodiment of the present invention is illustrated. Here, the network illustrated in FIG. 11 may correspond to an existing algorithm, and the network illustrated in FIG. 12 may correspond to an algorithm which lightens a neural network based on a repetition-reduction block according to the embodiment of the present invention.

In FIG. 11, when preset classification conditions are applied to the present invention, a first convolution layer Conv1 immediately meets a pooling layer Pool1right after Conv1, and thus Conv1 is too small to be bound as a block, so Conv1 is not set to a block section. Similarly, a second convolution layer Conv2 may not be set to a block section for the same reason as Conv1.

However, since each of a third convolution layer Conv3, a fourth convolution layer Conv4, and a fifth convolution layer Conv5 has two consecutive layers, Conv3, Conv4, and Conv5 may be set to respective block sections 1110, 1120, and 1130.

Therefore, in the block sections 1110, 1120, and 1130, a repetition-reduction block based on performance evaluation may be selected, and the neural network may be lightened in a form in which repetition-reduction blocks 1210, 1220, and 1230 are applied, as illustrated in FIG. 12.

Referring to FIGS. 11 and 12, it can be seen that, when the neural network is lightened using a repetition-reduction block, model information may be enriched, and performance may be improved, whereas the model sizes are scarcely changed.

Also, referring to FIGS. 15 and 16, a neural network architecture before being lightened may be compared with a neural network architecture after being lightened according to the embodiment of the present invention.

First, referring to FIG. 15, it can be seen that the neural network before being lightened is structurized in a form in which multiple convolution layers are repeatedly arranged. When such a neural network is input to the neural-network-lightening apparatus according to the embodiment of the present invention, the neural network may be lightened to an architecture such as that illustrated in FIG. 16.

That is, in the section in which multiple convolution layers are repeated in FIG. 15, repetition block sections 1610, 1620, and 1630 based on repetition blocks are created, and the output layers of the repetition block sections 1610, 1620, and 1630 are stacked in the CDC to reduce the layers, and thus it can be seen that the entire network architecture is simplified more than that of FIG. 15.

In this way, as the network architecture is simplified, a network computational load may be reduced while network performance may be maintained, and thus an effective network design may be implemented.

Furthermore, the processor 1330 is configured to, when the neural network is a previously developed neural network that is not configured using block units, classify the previously developed neural network into block units based on preset classification conditions.

That is, the previously developed neural network, which is input for lightening, is designed in a sufficiently large and complicated state to meet the designer's purpose. Accordingly, in order to lighten the neural network, a block section to which repetition-reduction blocks that can be regarded as blocks for performing reduction and reconstruction are to be applied may be classified.

Here, the preset classification conditions may include any one or any combination of any two or more of a first classification condition which classifies multiple consecutive convolution layers based on sub-sampling layers, a second classification condition which classifies multiple consecutive convolution layers based on layers having a skip connection, a third classification condition which classifies multiple consecutive convolution layers, which do not include sub-sampling layers, based on the preset consecutive number of times, a fourth classification condition which classifies depth concatenations between layers as a single block section, and a fifth classification condition which classifies convolution layers based on layers having different properties from multiple consecutive convolution layers.

For example, as illustrated in FIG. 4, it may be assumed that consecutive convolution layers are present, and that a sub-sampling layer, such as a pooling layer, is present between the convolution layers. In this case, based on the first classification condition, block sections 410 and 420 may be classified based on the sub-sampling layer.

Here, the sub-sampling layer may include a max pooling layer, an average pooling layer, etc.

However, when a convolution layer is a single layer rather than consecutive layers, as in the case of Conv2 illustrated in FIG. 4, the convolution layer may not be classified as a block section.

In another example, referring to FIG. 5, when there are convolution layers 510 and 520 having a residual skip connection, previous layers including the skip connection may be classified as a single block section by using a layer having the skip connection as a boundary, based on the second classification condition. Here, major parameters illustrated in FIG. 5 may correspond to a reduction parameter rr, an expansion parameter re, and a repetition parameter r, respectively, and various encoder/decoder models having deep and rich structures may be created by means of these parameters. Here, respective outputs resulting from repetitions may be stacked in CDCs, as illustrated in FIG. 5, or may be sent to a 1×1 convolution layer 530 so that they are transmitted to the decoder. Here, the CDCs may correspond to a bundle of various features extracted through encoding.

In a further example, when the number of layers corresponding to consecutive convolution layers is large, and it is difficult to classify block sections based only on sub-sampling layers, the consecutive convolution layers may be divided based on the preset consecutive number of times depending on the third classification condition, and may then be classified as block sections.

In this case, even if there are differences in the depth designs of network architecture layers, an output depth having a pervasive feature may be primarily classified.

Describing a computationally intensive section of YOLO v2, which is an object recognition model, by way of example, a pervasive depth may be set to 512 and 1024, and then block sections may be classified in a structure corresponding to 512-1024-512-1024-512-1024-1024-1024-64-1024 based on the output depth. Here, the block sections may be respectively classified to correspond to (512-1024-512-1024-512) and (1024-1024-1024-64-1024).

In yet another example, as illustrated in FIG. 6, if N convolution layers 610, 620, 630, and 640 have depth concatenation sections, convolution layers included in the corresponding sections may be classified as a single block section based on the fourth classification condition.

In still another example, when there is a layer having features to which other properties are added, unlike the consecutive convolution layers, block sections may be classified based on the corresponding layer depending on the fifth classification condition.

Meanwhile, the neural-network-lightening apparatus may be equipped with memory, and may internally store information in the apparatus. In an embodiment, the memory may be a computer-readable storage medium. In an embodiment, the memory may be a volatile memory unit, and in another embodiment, the memory may be a nonvolatile memory unit. In an embodiment, a storage device may be a computer-readable storage medium. In various different embodiments, the storage device may include, for example, a hard disk device, an optical disk device or any other mass storage device.

When the neural-network-lightening apparatus according to the embodiment of the present invention is used, the present invention may design a network that enables fast calculation despite imposing only a low computational load and has a low power consumption architecture by reducing the design exploration range of a neural network.

Further, the present invention may remodel a conventionally published network so that the network has low power consumption, light weight, and high-speed architecture, and may design a neural network having a suitable depth level based on a repetition block, thus preventing a computational load from excessively increasing.

In accordance with the present invention, there can be designed a network that enables fast calculation despite imposing only a low computational load and has a low power consumption architecture by reducing the design exploration range of a neural network.

Further, the present invention may remodel a conventionally published network so that the network has low power consumption, light weight, and high-speed architecture.

Furthermore, the present invention may design a neural network having a suitable depth level based on a repetition block, thus preventing a computational load from excessively increasing.

Furthermore, the present invention may relatively easily design a network architecture by reducing the number of layer-unit combinations while designing a network through the design of a block-unit model using a repetition block.

Furthermore, the present invention may stack repetition blocks or previously output layers in a condensed decoding connection (CDC), and reduce the stacked layers based on a reduction layer, thus designing a lightweight network architecture having a relatively low computational load.

As described above, in the neural-network-lightening method using a repetition-reduction block and an apparatus for the same according to the present invention, the configurations and schemes in the above-described embodiments are not limitedly applied, and some or all of the above embodiments can be selectively combined and configured so that various modifications are possible.

What is claimed is:

1. A neural-network-lightening method performed by a computer, the method comprising:
    receiving an initial neural network;
    generating from the initial neural network an optimized neural network using a repetition-reduction block and a Condensed Decoding Connection (CDC) by:
        determining, using one or more preset classification conditions, a block unit corresponding to a plurality of layers of the initial neural network;
        generating a plurality of repetition-reduction block candidates each corresponding to the block unit based on settings of hyperparameters determined according to a previous layer of the initial neural network or a previous repetition-reduction block candidate;
        performing respective performance evaluations on the plurality of repetition-reduction block candidates;
        selecting, according to results of the performance evaluations, the repetition-reduction block from among the plurality of repetition-reduction block candidates; and
        replacing the block unit with the repetition-reduction block, and
    storing the optimized neural network on a memory of the computer,
    wherein the CDC, implemented by the computer, is configured to stack one or more layers of the repetition-reduction block and to reduce the stacked layers based on a preset reduction layer, and
    wherein the performance evaluations relate to one or more selected from a list consisting of calculation speed, power consumption, and computational load, and
    wherein the optimized neural network provides one or more of an increased calculation speed, a reduced power consumption, and a reduced computational load of the computer compared to the initial neural network.

2. The neural-network-lightening method of claim 1, wherein the repetition-reduction block corresponds to a section in which layer reduction and layer expansion are repeatedly performed.

3. The neural-network-lightening method of claim 2, wherein the plurality of repetition-reduction block candidates comprises a first repetition-reduction block candidate having a corresponding first hyperparameter and a second repetition-reduction block candidate having a corresponding second hyperparameter, and a value of the first hyperparameter is different from a value of the second hyperparameter.

4. The neural-network-lightening method of claim 1, wherein the preset classification conditions include any one or any combination of any two or more of:
- a first classification condition which classifies multiple consecutive convolution layers based on sub-sampling layers,
- a second classification condition which classifies multiple consecutive convolution layers based on layers having a skip connection,
- a third classification condition which classifies multiple consecutive convolution layers, which do not include sub-sampling layers, based on a preset consecutive number of times,
- a fourth classification condition which classifies depth concatenations between layers as a single block section, and
- a fifth classification condition which classifies convolution layers based on layers having different properties from the multiple consecutive convolution layers.

5. The neural-network-lightening method of claim 2, wherein the hyperparameters include any one or any combination of any two or more of a kernel size, a maximum number of layers, a minimum layer depth, a maximum layer depth, a total number of repetitions, a total number of cases, a reduced number of layers, and a reduced number of channels.

6. The neural-network-lightening method of claim 1, wherein the preset reduction layer corresponds to a layer having a 1×1 kernel size.

7. A neural-network-lightening apparatus including-comprising:
- a processor; and
- a non-transient computer-readable storage medium with computer-readable instructions stored thereon which, when executed by the processor, cause the processor to perform steps comprising:
  - receiving an initial neural network;
  - generating from the initial neural network an optimized neural network using a repetition-reduction block and a Condensed Decoding Connection (CDC) by:
    - determining, using one or more preset classification conditions, a block unit corresponding to a plurality of layers of the initial neural network;
    - generating a plurality of repetition-reduction block candidates each corresponding to the block unit based on settings of hyperparameters determined according to a previous layer of the initial neural network or a previous repetition-reduction block candidate;
    - performing respective performance evaluations on the plurality of repetition-reduction block candidates;
    - selecting, according to results of the performance evaluations, the repetition-reduction block from among the plurality of repetition-reduction block candidates; and
    - replacing the block unit with the repetition-reduction block, and
  - storing the optimized neural network on the non-transient computer-readable storage medium,
- wherein the CDC is configured to stack one or more layers of the repetition-reduction block and to reduce the stacked layers based on a reduction layer having a 1×1 kernel size;
- wherein the performance evaluations relate to one or more selected from a list consisting of calculation speed, power consumption, and computational load, and
- wherein the optimized neural network, when implemented by a computer, provides one or more of an increased calculation speed, a reduced power consumption, and a reduced computational load compared to the initial neural network.

8. The neural-network-lightening apparatus of claim 7, wherein the repetition-reduction block corresponds to a section in which layer reduction and layer expansion are repeatedly performed.

9. The neural-network-lightening apparatus of claim 8, wherein the plurality of repetition-reduction block candidates comprises a first repetition-reduction block candidates having a corresponding first hyperparameter and a second repetition-reduction block candidate having a corresponding second hyperparameter, and a value of the first hyperparameter is different from a value of the second hyperparameter.

10. The neural-network-lightening apparatus of claim 7, wherein the preset classification conditions comprise any one or any combination of any two or more of:
- a first classification condition which classifies multiple consecutive convolution layers based on sub-sampling layers,
- a second classification condition which classifies multiple consecutive convolution layers based on layers having a skip connection,
- a third classification condition which classifies multiple consecutive convolution layers, which do not include sub-sampling layers, based on a preset consecutive number of times,
- a fourth classification condition which classifies depth concatenations between layers as a single block section, and
- a fifth classification condition which classifies convolution layers based on layers having different properties from the multiple consecutive convolution layers.

11. The neural-network-lightening apparatus of claim 8, wherein the hyperparameters include any one or any combination of any two or more of a kernel size, a maximum number of layers, a minimum layer depth, a maximum layer depth, a total number of repetitions, a total number of cases, a reduced number of layers, and a reduced number of channels.

* * * * *